Nov. 26, 1957   A. LIPPMAN, JR   2,814,100
METHOD OF SEALING A PORT IN A GLASS OBJECT
Filed Jan. 2, 1953

INVENTOR.
ALFRED LIPPMAN JR.
BY Toulmin & Toulmin
ATTORNEYS

United States Patent Office 2,814,100
Patented Nov. 26, 1957

2,814,100

METHOD OF SEALING A PORT IN A GLASS OBJECT

Alfred Lippman, Jr., Dayton, Ohio, assignor to The Commonwealth Engineering Company of Ohio, Dayton, Ohio, a corporation of Ohio Application January 2, 1953, Serial No. 329,423

4 Claims. (Cl. 29—530)

This invention relates to seals and more particularly to seal structures for glass and to methods of producing the same.

The air-tight sealing of glass bodies is a problem in many industries. For example, in the production of multi-pane windows for use in refrigerators, showcases, buildings, and the like, it is necessary to provide between the panes of glass a dead air space and this air space must be sufficiently sealed off from the atmosphere to insure that no moisture will enter the unit, as even the mositure of atmospheric air affects the glass detrimentally over a period of time.

It has been customary in the production of such multi-pane windows to secure a pair of spaced glass plates by a metal frame in which an organic sealing compound is incorporated for inhibiting the passage of moisture from the atmosphere to the dead air space. In such structures it is necessary to incorporate a silica gel or some other moisture absorbent to insure of long life of the assembly.

It has been proposed also to produce an all glass multi-pane construction by heating a pair of spaced flat plates to a temperature sufficient to render the glass electrically conductive (generally 950–1000° F.) and to then fuse hot semi-circular sections to the ends of the glass panes to form the air space.

Although the operations already set forth may be successfully performed, a problem arises that the air trapped within the window tends to create a vacuum as it cools which causes the large glass plates to buckle inwardly. To offset this, it is necessary to drill a small hole in one of the glass plates and to permit the ingress of dry air during the cooling in order to maintain atmospheric pressure within the unit. This hole, it may also be noted, is utilized for the blowing of air into the unit in order to round out the glass section while it is hot, and accordingly in such constructions, the hole is considered a necessity.

It may be noted that it has been found preferable to drill a hole in the form of a cone having a 3/16 inch diameter at the outside portion and a 1/8 inch diameter on the inside portion.

It is a principal object of this invention to provide a commercial process for the sealing of the above described hole, the sealing being effected by the application of the principles of gas plating in conjunction with an insert for the hole.

It is an important object of this invention to describe a seal structure which is air and moisture impermeable.

These and other allied objectives of the invention will become apparent from the following detailed description and the accompanying drawings wherein.

Figure 1:
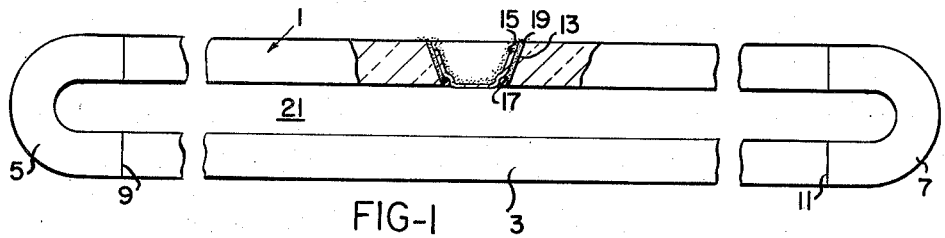
Figure 1 is an elevational view partly in section of an all glass multi-pane window.
Figures 2, 3:
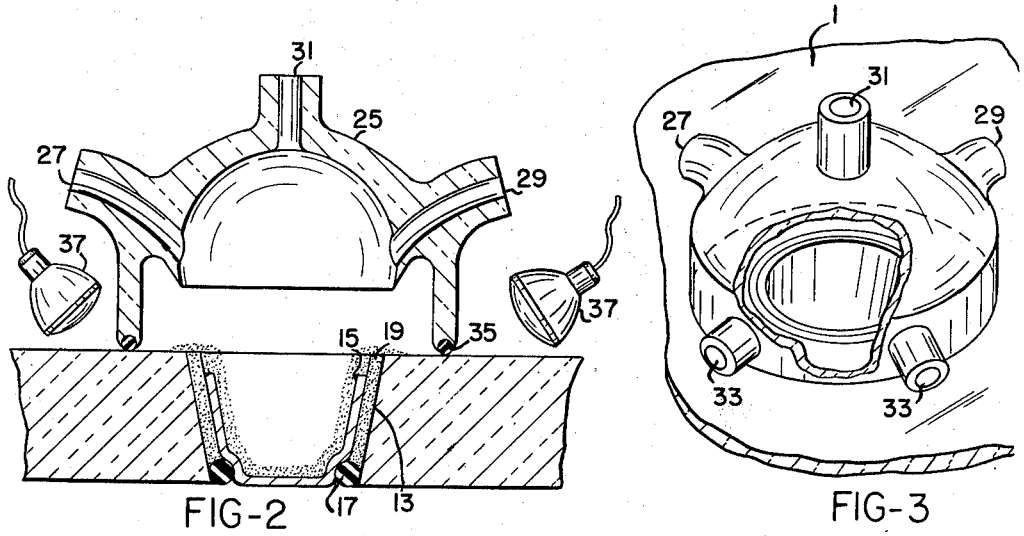
Figure 2 is a sectional view illustrating the manner in which the sealing is effected.
Figure 3 is a perspective view of the structure of Figure 2.

Referring to Figure 1 there is shown a pair of spaced glass plates designated 1 and 3, respectively, to which U-shaped glass end members 5, 7 are sealed as at 9 and 11. A port is shown formed in the glass plate 1 and is defined by a conical wall 13 in which there is positioned a cup shaped insert or truncated plug 15. This insert 15 preferably terminates below the upper lip of the port as shown (Figure 2).

The insert 15 is also provided over a lower peripheral portion thereof with a compressible silicone rubber gasket 17 which compressively engages the wall 13. Securing these components of the seal structure together in intimately adhered relation and air impermeable fashion is a deposit of metal 19 which extends between the insert 15 and wall 13 from the gasket 17 upwardly over into the cup of the insert and also over the lip of the glass walls of the port.

The seal shown in Figure 1 completely prevents the entry of moisture to the dead air space 21 and due to the nature of the method of depositing the metal 19 the seal structure is somewhat flexible and accordingly variations in temperature which might normally be expected in use, that is from minus 40° F. to 150° F., do not affect the sealing relation deleteriously.

It is noteworthy and very important that this seal between metal plug and glass as shown (Figure 2) extends outwardly beyond the conical plug onto the walls of the glass hole, then over the entire outer surface of the truncated conical metal plug. Thus is assured a seal not only between the metal and the glass, but this seal is integrated with an additional and supplementary seal extending over the outer walls of the glass port and of the metal plug. With this multiple protection such effects as contraction and expansion will not disrupt the sturdy seal and the double-sealing arrangement also gives more protection against mechanical rupture, as from impact. Gas plating deposits an unoriented, strong and impermeable film and the advantages flowing from such characteristics are inherent in the seal of invention.

The manner of forming the seal is illustrated by the structure of Figure 2 wherein the glass plate 1 is shown as having a port which receives a thin wall metal insert 15, as was described in connection with Figure 1. The insert 15 is provided around the lower peripheral wall thereof with a recess in which the silicone rubber gasket 17 is secured. The housing 25 positioned above the plates 1 is provided with inlets 27, 29 and 31 and with outlet ports as indicated at 33 in Figure 3. This housing 25 is preferably of an insulating material such as transparent glass, but may, if desired, be of metal, opaque glass or other suitable casing material, it being only important that a gas-tight seal be effected between the housing and the plate 1. This is accomplished in the present instance by providing a lower portion of the housing with a recess into which compressible rubber or silicone rubber gasket 35 extends for sealing engagement with the plate 1 as shown. Positioned adjacent the transparent glass housing 25 are infra-red lights 37 which are directed towards the insert 15 in the port of the plate 1.

In the practice of the method of invention, after the housing 25 is positioned as shown in Figure 2 the outlets 33 are connected to a source of vacuum, which preferably is only sufficient to keep fluid moving from the interior of the housing to the outlets 33. This is for the reason that in the operation of this structure it is desirable to have a reasonable gas pressure within the housing 25.

The gasket 17 is normally formed of a deformable material, so that the gasket may be compressively forced against the side walls before mounting of the chamber 25. In any event, it is necessary to insure that the compressive relation exerted by the gasket 17 between the walls 13 and the insert 15 is always such that no gas may pass the insert.

In the operation of the apparatus an inert gas, such as hydrogen, is passed through the inlet 31 and the flow of the hydrogen is continued for a sufficient period of time to insure the expulsion of all air from the interior of the housing. The insert 15, either during the in-flow of the carrier gas or thereafter, is heated by the infra-red lamps 37, which will also raise the temperature of the glass plate 1, which is beneficial as will be noted hereinafter.

With the temperature of the insert 15 sufficiently high to effect the decomposition of a heat decomposable metal bearing gaseous compound, a jet of such a gas preferably with a carrier gas such as hydrogen or carbon dioxide, is passed through each of the inlets 27, 29. This gas impinging upon the insert 15 and exposed wall 13, and entering the spacing between the insert and the walls 13 will be decomposed by the heat of the unit and an adherent coating of metal such as indicated in Figure 1 will be formed over the structure.

It is now to be noted that the temperature of the insert and of the glass wall 13 should be at least at the thermal decomposition point of the metal compound gas in order to obtain optimum adhesion of the deposit of metal to the glass surface and such temperature is readily attained by the use of infra-red lights such as 35 or by induction, dielectric or other common means, the selection being dependent generally upon the nature of the specific materials and the physical arrangement of the structure involved.

It is also to be noted that in the operation of the apparatus the hydrogen or other gas may be passed through the inlet 31 at a sufficient velocity to flex the insert slightly. This flexure compressively forces the gasket 17 against the wall 13 to effectively seal the air space 21.

In the employment of this process the temperature of the gas in the blast should be sufficiently high so as not to upset the temperature of the insert itself, that is any tendency toward cooling of the insert below the decomposition point of the metal bearing gas should be avoided. Such a process is effective with thin wall flexible metal inserts described hereinafter.

Figures 4, 5:
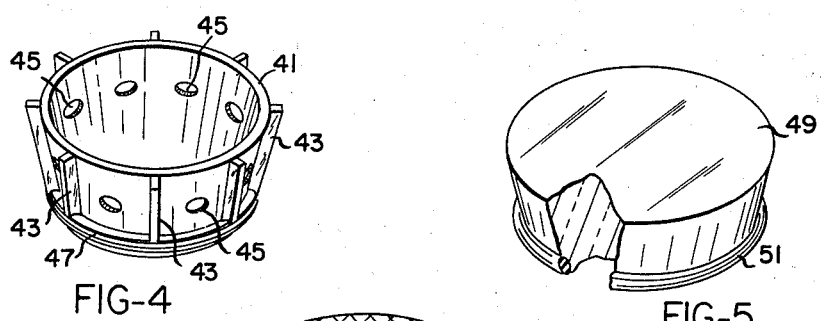
Figure 4 is a view of a novel insert useful in the practice of the invention.
Figure 5 is a view of another embodiment of the insert.

The form of insert useful in the practice of invention is not critical but the structure such as described in connection with Figure 2 is preferred. However, the insert may take the form shown in Figure 4 wherein a thin wall metal member 41 is provided with exterior ribs as at 43 and with a series of apertures as at 45. A gasket 47 similar to that described in connection with Figure 1 and serving a similar purpose is employed with insert 41 also.

In the use of this structure, the gas contacting the walls of the cup-shaped member 41 will pass therethrough and metal will be deposited in the cup-shaped member in the aperture 45 and will extend therethrough in a continuous fashion, the metal deposited between the inserts and the glass wall. The ribbing 43 may be so provided as to extend over the gasket 47 to insure that the same will not be dislodged to any extent by the application of pressure.

While the inserts heretofore described have been cup-shaped the same is not essential in the practice of the invention and the solid insert as indicated at 49 (Figure 5) suitably provided with a gasket 51 may be utilized and in this instance it is important that a complete glass coating extend across the peripheral juncture of the plate 1 and the insert 49 at the upper surface of the plate in order to insure of good adhesion and complete air impermeability.

Figure 6:
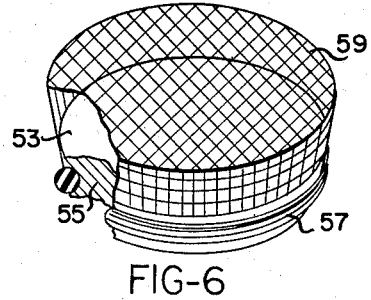
Figure 6 is a view of still another embodiment of a suitable insert.

The structure of Figure 6 indicates an effective embodiment of the insert in which the insert 53 is provided with an air impermeable base portion 55 about which a gasket 57 is secured. The upper portion of this insert 53 may be of any suitable wire mesh as indicated at 59 and when so employed the deposit of metal which coats over the inside of the insert will form a continuous film with metal deposited in the spacing between the insert and the wall 13 and an extremely strong seal is thus attainable.

In the practice of the invention the metal to be deposited and the chemical nature of the gaseous metal-bearing heat decomposable compound are not critical, but it has been found that nickel and iron deposited respectively from nickel carbonyl and iron pentacarbonyl adhere well to glass and accordingly these compounds are preferred.

For example the gas-plated seal may be made of nickel or of a 1:1 nickel-iron alloy. A plug comprising 50% nickel and 50% iron has the same coefficient of expansion as glass and is accordingly very desirable. It is therefore possible by use of such alloy to assure against any breakage of the seal from the extremes in temperature caused by contraction or expansion.

It is also permissible to use a glass instead of a metal plug; the glass of the plug may have the same composition as the glass object, and it may be rapidly heated by dielectric means. Such plug may also be preheated in conventional fashion if necessary and it may also be roughened as desired to provide exceptional deep bonded seals.

In the specific practice of the invention satisfactory seals may be formed as set forth in the following examples:

*Example I*

A tapered hole may be drilled in the wall of a $\frac{1}{16}$ inch thick glass plate, the hole having an outside diameter of about $\frac{3}{16}$ of an inch and an inside diameter of about $\frac{1}{8}$ of an inch. The walls of the hole or port will have a roughened surface as a result of the grinding and may be either used in this condition or may be smoothed off as desired for the receipt of a thin wall metal insert such as 15 having the silicone rubber gasket 17 secured around the lower peripheral portion thereof for air-tight engagement with the wall. Housing such as 25 is then fitted over the port in air-tight relation with the glass plate and as in this instance the plate is selected to accommodate an induction heating coil.

The temperature of the insert may be raised by the above means to 350–400° F. Thereafter hydrogen is introduced centrally through the housing 25 as set forth hereinbefore, vacuum being applied to the housing simultaneously with the introduction of the hydrogen to clear the housing of air and create a hydrogen atmosphere over the port. Thereafter jets of nickel carbonyl gas borne by a hydrogen carrier gas are introduced through the inlets 27, 29, the heat of the insert being effective to cause decomposition of the gas and deposition of metal over the insert and on the glass walls.

The time for effecting deposition will vary with the concentration of the metal-bearing gas and the rate of flow thereof, as will be understood by those skilled in the field, it being sufficient here to state that a deposition of sufficient thickness to form a seal is readily attainable in a matter of seconds. It may be generally stated that a flow rate through each port of about 1 liter per minute at a concentration of metal-bearing gas of 25% by volume is satisfactory.

After the port has been sealed with metal, the seal of the housing 25 is broken, the housing removed, and if desired the metal seal may be polished slightly. Such a seal will be entirely impermeable, resistant to changes in temperature between the limits of minus 40° F. to 150° F. and will give excellent results in salt spray tests.

Example II

With the conditions similar to those set forth in Example I but using iron pentacarbonyl gas and with the lines for the carriage of the pentacarbonyl suitably insulated to prevent premature condensation of the carbonyl, this gas similarly borne by hydrogen as a carrier, may be introduced to the heated seal (400° F.) and an adherent film of iron will deposit over the seal in the same manner as described in connection with nickel.

Example III

In this instance with the conditions otherwise the same as expressed in Example I, nickel carbonyl borne by hydrogen as a carrier is introduced through inlet 27 while iron pentacarbonyl suitably borne by carbon dioxide as a carrier is introduced to the seal which is heated to a temperature of about 400° F. and a deposition of about 50 percent iron and 50 percent nickel, a tough impermeable adherent film is obtained as described hereinbefore.

In this instance the concentration of iron carbonyl in its carrier stream is about 25 percent by volume, while the concentration of the nickel carbonyl in its jet stream is somewhat greater, that is about 35 percent by volume.

It is to be understood that other carrier gases than carbon dioxide and hydrogen may be employed, as for example, nitrogen and carbon monoxide, which are customarily used in the art.

Other metals which may suitably be deposited for the attainment of a seal are copper, chromium, molybdenum, tungsten, or combinations thereof, which may be applicable for a particular purpose. It is thus to be noted that the process of invention affords a wide selection of materials for the seal.

Further, while the invention has been particularly described in connection with the sealing of a port in a glass object, it is to be understood that other materials to which an adherent metallic deposit may be applied, are equally suitable for the practice of invention, for example, a gas plated metallic deposit may suitably be effected on ceramics, it being particularly notable that the adhesion to tile is generally very suitable for seal formation.

It is thus to be noted that a commercial process for the effecting of sealing of the multi-pane windows described hereinbefore has been clearly set forth, but the invention is not to be considered as limited thereto since clearly the seal structure of invention is applicable for other purposes.

This application is related to co-pending applications of Alfred Lippman, Jr., Serial No. 328,207, filed December 27, 1952, and Serial No. 328,208, filed December 27, 1952, now Patent No. 2,720,009, October 11, 1955, assigned to the same assignee as the present invention.

It will be understood that this invention is susceptible to modification in order to adopt it to different usages and conditions and accordingly, it is desired to comprehend such modifications within this invention as may fall within the scope of the appended claims.

I claim:

1. The method of sealing a port in a glass object, the object having a wall thereof defining the port, said method comprising closing the port to the entry of gases into the object by urging a compressible closure into contact with a lower portion of the port wall while leaving an upper portion of the wall exposed, heating the closure and exposed wall portion to the thermal decomposition point of a gaseous metal bearing compound, and contacting the so-heated closure and wall portion with a metal bearing gas decomposable at the temperature of the wall portion and closure to deposit metal over the closure and wall portion in a continuous film to permanently seal the port.

2. The method of sealing a port in a glass object, the object having a wall thereof defining the port, said method comprising closing the port to the entry of gases into the object by urging a compressible closure into contact with a lower portion of the port wall while having an upper portion of the wall exposed, closing off from the atmosphere the closure and the exposed wall portion, evacuating the spacing closed off from the atmosphere, heating the closure and exposed wall portion to the thermal decomposition point of a gaseous metal bearing compound, and contacting the so-heated closure and wall portion with a metal bearing gas decomposable at the temperature of the wall portion and closure to deposit metal over the closure and wall portion in a continuous film to permanently seal the port.

3. The method of sealing a port in a glass object, the object having a wall thereof defining the port, said method comprising closing the port to the entry of gases into the object by urging a flexible closure having a compressible part into contact with a lower portion of the port wall at the compressible part while leaving an upper portion of the wall exposed, closing off from the atmosphere the closure and the exposed wall portion, evacuating the spacing closed off from the atmosphere, directing a stream of a gas against the flexible closure to maintain the same tightly sealing the port, heating the closure and exposed wall portion to the thermal decomposition point of a gaseous metal bearing compound, and contacting the so-heated closure and wall portion with a metal bearing gas decomposable at the temperature of the wall portion and closure to deposit metal over the closure and wall portion in a continuous film to permanently seal the port.

4. The method of sealing a port in a glass object, the object having a wall thereof defining the port, which method comprises supporting a compressible closure in contact with a lower portion of the port wall to close the port against the entry of gases into the object while leaving an upper portion of the wall exposed, the upper portion of the closure being apertured and spaced from the wall, heating the closure and exposed wall portion to the thermal decomposition point of a gaseous metal bearing compound, and contacting the so-heated closure and wall portion with an atmosphere of a metal bearing gas decomposable at the temperature of the wall portion and closure to cause the gas to pass through the apertures of the closure and to deposit on the wall and closure to secure the same together and permanently seal the port.

References Cited in the file of this patent

UNITED STATES PATENTS

| Number | Name | Date |
|---|---|---|
| 1,816,476 | Fink | July 28, 1931 |
| 2,050,576 | Kronquest | Aug. 11, 1936 |
| 2,138,404 | Haas | Nov. 29, 1938 |
| 2,189,928 | Scharfnagel | Feb. 13, 1940 |
| 2,293,037 | Atlee | Aug. 18, 1942 |
| 2,401,483 | Hensel | June 4, 1946 |
| 2,457,599 | Pessel | Dec. 28, 1948 |
| 2,475,601 | Fink | July 12, 1949 |
| 2,584,653 | Alpert | Feb. 5, 1952 |
| 2,621,397 | Black | Dec. 16, 1952 |
| 2,685,124 | Toulmin | Aug. 3, 1954 |